United States Patent [19]

Walles et al.

[11] Patent Number: 4,741,401

[45] Date of Patent: May 3, 1988

[54] METHOD FOR TREATING SUBTERRANEAN FORMATIONS

[75] Inventors: Wilhelm E. Walles, Freeland, Mich.; Trevor D. Williamson, Tulsa, Okla.; Donald L. Tomkinson, Auburn, Mich.

[73] Assignee: The Dow Chemical Company, Midland, Mich.

[21] Appl. No.: 4,385

[22] Filed: Jan. 16, 1987

[51] Int. Cl.$^4$ .............................................. E21B 43/26
[52] U.S. Cl. ................................... 166/300; 166/308; 252/8.551
[58] Field of Search .................. 166/270, 300, 308; 252/8.551; 206/524.7

[56] References Cited

U.S. PATENT DOCUMENTS

| | | | |
|---|---|---|---|
| 3,952,741 | 4/1976 | Baker | 128/260 |
| 3,992,317 | 11/1976 | Brichard et al. | 252/186 |
| 4,202,795 | 5/1980 | Burnham et al. | 166/308 |
| 4,259,205 | 3/1981 | Murphey | 252/8.551 |
| 4,382,003 | 5/1983 | Kucera et al. | 166/308 |
| 4,506,734 | 3/1985 | Nolte | 166/308 |
| 4,610,795 | 9/1986 | Norris | 166/308 |

*Primary Examiner*—Stephen J. Novosad
*Assistant Examiner*—Bruce M. Kisliuk

[57] ABSTRACT

Control release capsules comprising a breaker contained within a enclosure member are employed to break fracturing fluids. The enclosure member is permeable to at least one fluid in the subterranean formation or injected with the capsules such that upon sufficient exposure to the fluid, the capsules rupture, thereby releasing the breaker to the formation. In such manner, the release of the breaker can be conducted in a controlled manner. In addition, the entire amount of breaker introduced into the formation is released.

35 Claims, No Drawings

METHOD FOR TREATING SUBTERRANEAN FORMATIONS

BACKGROUND OF THE INVENTION

The present invention relates to fracturing fluids and to a method for delivering a material into a subterranean formation and, more particularly, to a method for breaking a fracturing fluid using a controlled release capsule for delivering the breaker to the fracturing fluid in the subterranean formation and the fracturing fluids containing such controlled release capsule.

In the drilling of a well and the subsequent recovery of fluids such as crude oil and natural gas from subterranean formations, various materials are added to the well bore and/or subterranean formation to improve the efficiency of the well drilling operation, to increase production of the fluids from the formation and/or to terminate and seal a non-producing well. These treating agents are generally added, in their active form, above ground and flowed into the well bore or through the well bore to the subterranean formation.

For example, a subterranean formation is often subjected to a fracturing treatment to stimulate the recovery of fluids such as crude oil or natural gas. In fracturing the formation, a fluid is introduced into the well at a rate and pressure sufficient to produce one or more fractures in the formation and/or enlarge or extend existing fractures. The fluid can contain a propping agent such as sand or sintered bauxite which is deposited in the fractures to maintain the fractures and/or an acid which reacts with the acid-soluble components of the formation thereby creating and enlarging passageways for the flow of fluids from the formation.

Heretofore, in both hydraulic fracturing and fracture acidizing operations, a high viscosity, gelled aqueous fluid, a high viscosity water/hydrocarbon emulsion or a foam of a gas/water dispersion has typically been employed. These high viscosity fluids are capable of the necessary penetration to realize maximum benefits from the fracturing operation and in suspending the propping agents, if employed, without excessive settling. In addition, the high viscosity fluids are capable in opening the fractures to a greater width than is possible with the low viscosity fluid.

After the high viscosity aqueous solution or emulsion has been pumped into a subterranean formation and the fractures formed, it is generally desirable to convert the gel or emulsion into a low viscosity fluid, thereby allowing the fluid to be removed from the formation and the desired material such as oil or natural gas, to flow back through the fractures into the wellbore. This reduction of the viscosity of the fracturing fluid is commonly referred to as "breaking" the gel or emulsion. Conventionally, this breaking of the gel or emulsion is carried out by adding a viscosity reducing agent (commonly called a "breaker") to the formation at the desired time. Unfortunately, the described techniques often result in insufficient breaking (i.e., an insufficient reduction in the viscosity of the fracturing fluid) or premature breaking of the fluid. Premature breaking of the fluid causes a reduction in the viscosity of the fracturing fluid prior to the desired termination of the fracturing operation, thereby reducing the overall effectiveness of the operation.

One proposed method for controlling and/or delaying the activity of the viscosity reducing agent or "breaker" consists of introducing to the subterranean formation the breaker in a prill or pellet formed by combining the breaker with a hydratable gelling agent and gell degrading substance and forming the resulting mixture into the desired prill or pellet form. See, for example, U.S. Pat. No. 4,202,795. Upon exposure of the prills or pellets to an aqueous fluid, the gelling agent is said to hydrate and form a protective gel around each of the pellets, thereby preventing the release of the breaker into the aqueous fluid until the protective gel is broken by the gel-degrading substance. In this manner, the cited reference claims that the breaker can be released to the aqueous fluid in a controlled manner. It appears that a relatively large amount of the hydratable gelling agent is required to prepare the pellets and that the amounts of the hydratable gelling agent must be carefully controlled. In addition, the time period over which the pellets are released may vary substantially.

In another method for delaying the release of a breaker, U.S. Pat. No. 4,506,734 proposes introducing a viscosity reducing chemical contained within hollow or porous, crushable beads in the hydraulic fracturing fluid. The viscosity reducing agent is said to be released upon the crushing of the beads which results from the closing of the fractures caused by the fracturing fluid passing or leaking off into the formation or by removing the fluid by backflowing. Unfortunately, the stresses caused by the closing of the formation will affect the percentage of beads being crushed so that a large percentage of beads may remain unbroken, particularly if the formation closes at a slow rate. In addition, a large percentage of the beads may be crushed in one area of the formation being treated, whereas in a second area of the formation, a substantially lower amount of the beads may be crushed. Therefore, inconsistent performance can be expected.

Although the foregoing methods appear to provide for delayed release of a breaker into the subterranean formation, it remains desirable to provide an alternative method and commercially more practicable method which give equivalent or superior performance.

SUMMARY OF THE INVENTION

Accordingly, in one aspect, the present invention is a method for breaking an aqueous fracturing fluid treating a subterranean formation. Specifically, the method for breaking the fracturing fluid comprises injecting into the subterranean formation a controlled release capsule comprising an enclosure member containing the breaker. The enclosure member is sufficiently permeable to at least one fluid existing in the subterranean environment or injected with the controlled release capsule such that the enclosure member is capable of rupturing upon sufficient exposure to the fluid, thereby releasing the breaker.

Using the method of the present invention, breaking of fracturing fluids is significantly improved. Specifically, regardless of the release mechanism, all or substantially all the controlled release capsules will release the contained breaker, at some time, into the formation. Therefore, although it is contemplated that the breaker may, and often will, be released by the stresses generated on the capsules by closure of the formation, crushing due to formation closure is not required for release. In addition, even if such crush release is the primary release mechanism, the beads which are not crushed will release the breaker to the formation. Therefore, a more consistent performance using less materials is achieved by the method of the present invention.

In addition, the release of the breaker can be effected in a relatively controlled manner. Specifically, the controlled release capsule can be designed such that the release of the active substance can be delayed for a desired period of time, e.g., a number of hours, days or weeks, followed by the relatively rapid release of the encapsulated, breaker to the formation at the desired time. In addition, using the method of the present invention, it is possible to add the encapsulated material to a wellbore above ground and flow the material to the desired location in the subterranean formation without releasing the material to the fracturing fluid prior to the desired time or until it reaches the desired location. Upon arrival at the desired location and/or a given amount of time, the encapsulated breaker can be released.

In another aspect, the present invention is a fracturing fluid comprising a carrier fluid, a viscosifying polymer and a controlled release capsule of an enclosure member containing a breaker for the viscosifying polymer wherein the enclosure member is sufficiently permeable to the carrier fluid or at least one fluid existing in the subterranean environment such that, upon sufficient exposure, the enclosure member is capable of rupturing, thereby releasing the breaker.

DETAILED DESCRIPTION OF THE INVENTION

The controlled release capsule employed in the practice of the present invention comprises an enclosure member which contains a breaker or other chemically active material. The enclosure member is permeable to at least one fluid existing in the subterranean environment or injected with the controlled release capsule such that, upon sufficient exposure to the fluid, the enclosure member is capable of rupturing thereby releasing the breaker.

As used herein, the term "sufficiently permeable", it is meant that the controlled release capsules, when dispersed in the permeating fluid, do not release an undesired amount of the breaker at ambient mixing temperatures and pressures, i.e., temperature and pressure of the mix water or other fluid, during the time required for mixing and delivery but which release an amount of breaker effective to reduce the viscosity of the thickened liquid at the pressures and temperatures of the reservoir being treated. In general, the permeating fluid is an aqueous liquid and, to provide the desired performance, the controlled release capsules will release less than 10, more preferably less than 5, most preferably less than 1, weight percent of the encapsulated breaker within the first 0.5 hour of immersion at some temperature between 10° and 30° C. and standard pressure will release and at least 50, more preferably at least 60, weight percent of the encapsulated breaker within 48 hours after initial immersion at some temperature from 10° C. to 200° C. and standard pressure. In such manner, the controlled release capsule is capable of containing the breaker during normal storage and, preferably, until delivery of the capsule to the formation, and, when, the pressure in the interior of the capsule increases sufficiently due to penetration of the fluid into the capsule to cause the rupture of the enclosure member. As the term is used herein, a substantially impermeable enclosure member is one which does not release the specified amount of the encapsulated breaker within the hereinbefore described time period.

The enclosure member is suitably any coating which is permeable, either due to the permeability of the coating material and/or from flaws, fissures, holidays and the like in the coating, to at least one fluid (generally, water) found in the subterranean formation being treated or in the fluid injected with the capsules into the formation and which is capable of releasing the breaker, at the temperatures existing in the formation, due to an increase in the pressure inside the capsule as compared to the environmental pressure. In general, the enclosure member is preferably prepared from a material which is permeable to a fluid existing in the subterranean environment or which is injected with the capsules into the formation. In such manner, the penetration of the fluid into the capsule through the capsule walls creates an increased pressure within the capsule.

The material most advantageously employed as the enclosure member will vary depending on a variety of factors. Among the various factors are the physical and chemical properties of the material being employed as the enclosure member, the operating conditions (including the temperature) to which the capsule is to be exposed, the breaker employed and its compatibility with the enclosure member, and the desired time and mechanism for release. For example, the amount of stress created by the closure of the formation as well as the desired time for release after injection of the capsules should the capsule be exposed to no external stress will need to be considered in selecting the most preferred enclosure member for an application.

The enclosure member is generally a water-insoluble, water-permeable material. The permeability, as well as, to a lesser extent, the thickness and elasticity, of the enclosure member determines the rate at which the environmental water can be imbibed into the capsule followed by rupture of the enclosure member and release of the encapsulated material. The water permeabilities of materials which can be employed as the enclosure member can vary widely. For example, if applied at a sufficiently thick coating, a cellulosic material such as cellulose acetate or cellulose acetate butyrate, which both have a relatively high water permeability, can be employed as the enclosure member. However, in general, in the practice of the present invention, the water-permeable enclosure member preferably has a water permeability such that the water vapor transmission rate ("WVTR") of the material is less than about 20 grams of water per 100 square inch film having a thickness of 1 mil per 24 hour period (g/100 in$^2$/24 hours) at 38° C. Although materials having a higher WVTR can be employed, thicker coatings are generally required which can make their use impractical. Preferably, the WVTR of a 1 mil thick film is less than about 8, more preferably less than about 5, g/100 in$^2$/24 hours at 38° C. Although an enclosure member which has at least a measurable WVTR can be employed given the proper set of circumstances, in general, the WVTR of the material employed as the enclosure member is advantageously greater than 0.01 for a film of 1 mil. Preferably, the WVTR of a 1 mil film of the material employed as the enclosure member is prepared from a material which, as a 1 mil film, has a WVTR of greater than about 0.02, more preferably greater than about 0.05 g/100 in$^2$/24 hours.

Representative materials having the desired water permeabilities include various polymers, including homopolymers and copolymers, of ethylenically unsaturated monomers such as ethylene, propylene, isobutylene, vinyl chloride, vinylidene chloride, styrene, ethyl cellulose and cellulosic materials of similar properties, and vinyl acetate. In addition, hydrocarbon waxes; polymers of ethylene oxide, propylene oxide or combination thereof; epoxides; and polycarbonates can also be employed as the enclosure member. Of such materials, polyethylene, polypropylene, polyisobutylene, polyvinylacetate, copolymers of vinyl chloride and vinylidene chloride, copolymers of styrene and butadiene, copolymers of vinylidene chloride and an ester of an unsaturated carboxylic acid such as methylacrylate, copolymers of ethylene and an unsaturated carboxylic acid and/or salt thereof such as acrylic acid or its sodium salt and copolymers of ethylene and vinyl acetate are preferred.

The breaker contained by the enclosure member of the controlled release capsule can be essentially any solid or liquid material which does not adversely interact or chemically react with the enclosure member employed to destroy its integrity prior to the desired release of the breaker and which is capable of reducing the viscosity of the fracturing fluid. Representative examples include enzymes such as cellulase, oxidizers, transition metal salts, in ionized form, such as the ionized form of iron (e.g., $FeCl_3$), silver ($AgNO_3$) or copper ($CuSO_4$); acids such as mineral acids (e.g., HCl) or certain organic acids such as acetic acid or mixtures of two or more breakers. These compounds may be employed following absorption into porous clay or other porous material and then encapsulated.

In the method of the present invention, the pressure generated within the enclosure member due solely to the fluid penetrating into the capsule will destroy the integrity of the enclosure member. In certain cases, the speed of rupture will be decreased when a material contained by the capsule reacts or otherwise interacts with the fluid which has penetrated into the capsule to generate a gas, expand or the like, thereby increasing the pressure within the capsule and accelerating rupture of the enclosure member. For example, when the material and the fluid react to form a gas, the generated gas increases the internal pressure in the capsule as the reaction progresses, distending the enclosure member until it ruptures. For this reason, in aqueous environment, the method of the present invention is often employed with an oxidizing agent which is useful as a viscosity-reducing agent or breaker. Many of these oxidizing materials react with the water penetrating into the capsule to form a gas. Of the oxidizing agents, the preferred oxidizing agents include ammonium, sodium or potassium persulfate; sodium peroxide; sodium chlorite; sodium, lithium or calcium hypochlorite; chlorinated lime; potassium perphosphate; sodium perborate; magnesium monoperoxyphthalate hexahydrate; and a number of organic chlorine derivatives such as N,N'-dichlorodimethylhydantoin and N-chlorocyanuric acid and/or salts thereof. Most preferably, the viscosity-reducing agent is ammonium or sodium persulfate, lithium hypochlorite or sodium salt of dichloroisocyanuric acid.

The breaker is coated with the enclosure member to form a controlled release capsule of the desired shape and size with a coating of a desired thickness. The shape, size and composition of the controlled release capsule which is most advantageously employed herein will be dependent on a variety of factors including the specific fracturing treatment, the proppants, if any, employed, the specific controlled release capsule, the amount of the particular breaker to be delivered to the fluid, the desired release mechanism, and the desired time of release. Although capsules containing as much as 10 grams (g) of the breaker, which capsules are easily prepared using injection molding techniques or by coating the active material with a lacquer comprising a material useful in forming an enclosure member, in general, the capsules are prepared such that they contain from about 5 nanograms to about 1 g, more preferably form about 0.05 to about 500 milligrams of the breaker. In general, at such amounts, the controlled release capsules will exhibit an average particle size from about 0.01 to about 5 millimeters (mm), preferably from about 0.05 to 2 mm. Capsules having two or more distinct particle sizes can also be employed in any given operation.

The controlled release capsules can be prepared such that the enclosure member surrounds one or more particles of the active liquid or solid material. For example, the capsules may be prepared as a mononuclear particle having a liquid or solid core of the breaker encapsulated by the enclosure member, as a mononuclear core having a multiple wall enclosure member or as a polynuclear core wherein each core is encapsulated by a permeable enclosure member but agglomerated or otherwise attached to form a single particle. Of the various particle configurations, the controlled release capsule is most advantageously prepared having a mononuclear core with the liquid or solid breaker encapsulated within a single layer of the permeable material. The capsules can be of essentially any shape, including spherical, cubic or irregular, with generally spherical beads such as prepared in a fluidizing bed process being preferred.

Prior to the coating operation, it is often advantageous to separate, where possible, a solid breaker by its particle size to remove any fines and/or clumps. In this manner, the subsequently prepared capsules contain approximately equal amounts of the material and time of release of the material from the capsule can be more clearly defined, i.e., the particles tend to release within a narrower time span. Alternatively, such size classification can be conducted after the coating operation, but this is less preferred.

Any of a variety of techniques well-known in the art can be employed for producing the controlled release capsule and reference is made thereto for the purpose of this invention. Of the various methods which can be employed, the controlled release capsule is most advantageously prepared using a fluidized bed process wherein the particle of the breaker are sprayed with a suitable permeable material which suspended in a rapid flow of air or other gas. Illustrative of such fluidized bed processes are described in Knack H., "Microencapsulation Techniques, Applications and Problems", *J. Soc. Cos. Chem.*, 21, 85–98 (Feb. 4, 1970) and U.S. Pat. Nos. 3,237,596 and 3,382,093. Although the fluidized bed method for preparing controlled release capsules is most advantageously employed in coating breakers which are solid at the temperature at which the coating operation is being conducted, it can also be employed in coating liquids, particularly if the liquids are frozen before or during fluidization in the coating process or absorbed into porous particles such as a porous fired clay. Other coating processes such as phase separation, coacervation and acoustic levitation can also be employed in preparing the controlled release capsule, but are generally less preferred. Preferably, the coating operation is conducted at conditions so as to prevent individual particles from sticking to one another during the operation and to minimize particles which are only partially coated. After preparation of the controlled release capsule, the capsule may be further treated, e.g., heat treatment, to alter the properties of the coating.

In preparing the controlled release capsule, the permeable material is applied at a thickness sufficient to delay the release of the breaker for a desired period of time at the temperatures encountered in the operation. In addition, the controlled release capsules useful in the practice of the present invention are preferably sufficiently strong and ductile to prevent the capsule's break-up during processing including the passage of the controlled release capsule through surface pumps and blending equipment commonly utilized in the operation and when being introduced into the formation. In general, the coating thickness of the water-permeable enclosure member is from about 0.5 to about 100 $\mu$m. More preferably, the coating thickness if from about 5 to about 60 $\mu$m.

The method of addition and the amounts of the controlled release capsule employed are dependent on a variety of factors including the specific end use application and the desired time for the rupture of the enclosure member. As an example, in the reduction of the viscosity of a fracturing fluid, the controlled release capsule containing the viscosity-reducing agent can be added with (as well as, in certain cases, prior to or after) the addition of the fracturing fluid to the subterranean formation. In general, the method preferably comprises adding the fracturing fluid and thereafter adding the controlled release capsules containing the viscosity reducing agent.

In general, the controlled release capsule is added above ground to the wellbore as a dispersion in an aqueous carrier fluid and flowed to the desired location in the subterranean formation. As used herein, the term "subterranean formation" includes the formation as well as the well bore penetrating the formation. The term "aqueous fluid" refers to water (including alkaline or acidic aqueous solutions), brines, and mixtures of water and one or more water miscible liquid such as a lower alkanol, e.g., ethanol or propanol, a lower ketone, e.g., acetone or methyl ethyl ketone, and the like. The aqueous liquid containing the controlled release agent, which liquid can be the fracturing fluid, generally contains from about 0.001 to about 2, preferably from about 0.01 to about 1, weight percent of the controlled release capsules based on the weight of the aqueous fluid employed.

The controlled release capsules are often advantageously added with a fracturing fluid. Fracturing fluids and their components are well known in the art and reference is made thereto for the purpose of this invention. Essentially all fracturing fluids contain a carrier fluid which is conventionally an aqueous liquid and a viscosifying polymer. In addition, the fracturing fluid will also generally contain one or more additives such as surfactants, salts such as potassium chloride, antifoam agents, bactericides and cross-linking agents for the polymeric thickener.

In the practice of the present invention, the breaker can be released from the capsule to the formation when the pressure differential between the environmental pressure and the interior of the capsule caused by fluid migration into the capsule is sufficient to rupture the enclosure member. However, in the general practice of the present invention, it is contemplated that release of the breaker will not result from this mechanism only and that this release mechanism may not be the only, or even the primary mechanism, causing the release of the breaker to the formation. For example, primary release of the breaker from the capsules may result from stresses caused by the closure of the formation. Rupture of the enclosure member (and the subsequent release of breaker to the formation) from increased internal pressures is then exhibited only in those capsules not so broken.

The method of the present invention can also be employed to place a mixture or combination of breakers or the mixture or combination of a breaker with a second treating agent into the subterranean formation. For example, a controlled release capsule containing a single breaker can be blended with a controlled release capsule containing a breaker of the same or different type (or, alternatively, a different treating agent) for introduction into the wellbore and subsequently into the subterranean formation. Alternatively, the two breakers or breaker and treating agent can be combined into a single controlled release capsule. In another method, the controlled release capsules can be employed in conjunction with other capsules of an enclosure member which is substantially impermeable to the fluid or fluids existing in the formation or injected with the capsules and containing the same or different treating agent as contained by the controlled release capsule. In this method, the different capsules can be added as a mixture to the wellbore and/or subterranean formation or sequentially.

In the method of the present invention, the premature release of breaker may be occasioned by incomplete coating by the enclosure member, the unintended or unpreventable rupture during the mixing and delivery step, or the like. In many cases, this premature release of breaker can adversely affect the operation. Therefore, it is often advantageous to add some material with the controlled release capsule which will neutralize the affect of the unintentionally released material on the operation.

The following examples are presented to illustrate the invention and should not be construed to limit its scope. All percentages and parts are by weight unless otherwise indicated.

EXAMPLE 1

About 400 grams (g) of ammonium persulfate crystals having a diameter of about 1 millimeter (mm) are fluidized in a UniGlatt fluidized bed apparatus using a Wurster column. These crystals are then sprayed with a polymer latex consisting of about 15 percent solids. The polymer is a copolymer derived from about 90 mole percent vinylidene chloride and about 10 mole percent methyl acrylate. A spray nozzle with level setting and air pressure of 3 bars combined with an exhaust filter bumping scheme of 5 seconds duration with a 0.75 minute interval is employed in the coating operation. The inlet temperature is 60° C. and the feed rate about 15 milliliters (ml) per minute. The spray time is about 10 minutes. The capsules have a coating thickness which vary from 20 to 50 $\mu$m and an average coating thickness of 30 $\mu$m. This procedure is repeated nine times and the resulting capsules blended.

Ten grams of the thus blended capsules are placed in 1000 g water at room temperature. Due to the irregularities in the coating and the fact that all beads are not completely coated with enclosure member, about 20 weight percent of the persulfate is released within about 5 hours of the initial contact of the beads with water. Less than ten percent of the persulfate originally contained by the capsules is released in the subsequent 45 hours, which indicates that the capsules will effectively retain the persulfate until the time at which release is desired.

When 10 g of the capsules are placed in 100 g of water maintained at 65° C., again about 20 weight percent of the persulfate is released within the first 5 hours. No appreciable amount of persulfate is then released until about 20 hours after initial contact. At this time, the capsules begin to burst and within 30 hours after initial contact of the capsules with water, about 90 weight percent of the persulfate is released to the water, indicating that release can be delayed until a desired time and then the active component can be substantially completely released within a short period of time.

When 10 g of the capsules are placed in water at 81° C., the entire amount of persulfate contained by the capsule is completely released within 5 hours after initial contact.

During the release of the material from the capsules, it is noted, by observing the capsules under a microscope (50×) that the coating is being lifted from the encapsulated material by gas bubbles formed by reaction of the oxidizing agent and water.

By varying the coating thickness, specific enclosure member and/or the material contained by the capsule, the release characteristics of capsule can be varied to almost any extent. For example, when lithium hypochlorite crystals having a diameter of about 2 mm are coated by the foregoing techniques at conditions such that the capsules have a coating thickness of about 50 $\mu$m, the burst release time in water at room temperature is expected to be about 4¾ hours from the time of the initial contact of the capsules with the water.

When magnesium monoperoxyperphthalate hexahydrate crystals having a diameter of about 1 mm are coated with the same polymer using similar techniques but at conditions to achieve a coating thickness of only about 16.5 $\mu$m, the burst release time is found to be about only 9 minutes. This shorter release time is due to the substantially thinner coating on the crystals. Similarly, sodium perborate crystals having a 1.5 mm diameter coated with the polymer latex to give a coating thickness of about 7.9 $\mu$m is expected to have an average release time of about 35 minutes.

EXAMPLE 2

About 1800 g of ammonium persulfate crystals passing through a 20 mesh screen (U.S. Standard) and being stopped by a 40 mesh screen (U.S. Standard) are fluidized in a UniGlatt fluidized bed apparatus operating in the Wurster mode. These crystals are then sprayed with a polymer latex consisting of about 12.5 percent solids The polymer is a copolymer derived from about 92 mole percent vinylidene chloride, about 5 mole percent methyl acrylate and about 3 mole percent acrylonitrile. The polymer solution is atomized at a pressure of about 2 bars and sprayed at a rate of 10 milliliters (ml) per minute for a total time of 240 seconds. The inlet temperature was 43° C. The capsules have an average coating thickness of about 30 $\mu$m.

Seventeen grams of the thus prepared capsules are placed in 80 g water at 65° C. Less than two percent of the persulfate contained by the beads are released during the first 2 hours after initial contact of the capsules with water. The persulfate is then released at a rate such that 13 weight percent of the persulfate is released at 4 hours after initial contact of the capsules with water, 40 percent is released at 6 hours and 47 percent of the persulfate is released after initial contact.

EXAMPLE 3

Following the procedure of Example 2, 1500 g of ammonium persulfate crystals are coated in a UniGlatt fluidized bed apparatus operating in the Wurster mode using a polymer latex containing about 12 percent of the polymer latex of Example 1 and 0.3 percent of an antiblocking compound to produce free flowing capsules.

When placed in water maintained at 65° C., the capsules released the ammonium persulfate at about the same rate as the capsules described in Example 2.

Sufficient amounts of the capsules containing the ammonium persulfate are added, with agitation, to a 50 ml solution of about 1 percent hydroxypropylguar in water maintained in a viscometer cup to give a 0.2 percent dispersion (Sample No. 1) of the capsules in the solution. The viscometer cup is then left static (i.e., the dispersion is not agitated) for a period of about 30 minutes after which the viscosity is measured. The viscometer cup is then pressured to about 27.2 atmospheres with nitrogen gas and the dispersion is then sheared at a rate of 170 sec$^{-1}$, heated up to 65° C. at a rate of about 5.5° C./minute for four hours and the viscosity measured every 30 minutes over the four hour period. The dispersion is then left static for an additional 44 hours, with the viscosity being measured every four hours. The percent of the original viscosity of the solution retained as a function of time after initial contact of the solution with the capsules containing the ammonium persulfate is set forth in the following Table.

| Time after Initial Contact, hrs. | Viscosity Retained, % |
| --- | --- |
| 0.5 | 99 |
| 1.0 | 97.5 |
| 1.5 | 96 |
| 2.0 | 95 |
| 2.5 | 94 |
| 3.0 | 92 |
| 3.5 | 90 |
| 4.0 | 89 |
| 8.0 | 66.5 |
| 12.0 | 47 |
| 16.0 | 42 |
| 20.0 | 40 |
| 24.0 | 37 |
| 28.0 | 35 |
| 32.0 | 32.5 |
| 36.0 | 30 |
| 40.0 | 25.5 |
| 44.0 | 24 |

As is evidenced by the data set forth in the foregoing Table, the viscosity of the solution is substantially retained until between 4 and 12 hours, during which time the viscosity decreases rapidly. This indicates that most of the the capsules retain the ammonium persulfate until between 4 and 12 hours after initial contact with the aqueous solution, at which time the ammonium persulfate breaker is released to the solution and the viscosity broken. After 16 hours, the viscosity remains relatively stable, with a small decrease in viscosity being noted.

This indicates that only small amounts of ammonium persulfate are being released from the capsules after the initial 16 hours of contact. In this manner, the breaking of a solution can effectively be controlled.

Testing is repeated in an identical manner except that the ammonium persulfate is added directly to the thickened solution. Within 0.5 hours at 65° C., the viscosity of the solution has dropped to less than 20 percent of its initial viscosity. Thus, when added directly to the thickened solution, the breaking of the viscosity occurs too rapidly and is undesirable. When no breaker is added to the thickened solution, the solution viscosity is still over 80 percent of its original solution viscosity after 44 hours time. This high viscosity after such a long period of time is also undesirable.

What is claimed is:

1. A method for breaking an aqueous fracturing fluid which comprises injecting into a subterranean formation controlled release capsules comprising an enclosure member enclosing a breaker for the aqueous fracturing fluid; the enclosure member being sufficiently permeable to at least one fluid existing in the subterranean environment or injected with the controlled release capsules such that the enclosure member is capable of releasing the breaker upon sufficient exposure to the fluid.

2. The method of claim 1 wherein the controlled release capsules are injected into the formation as a dispersion in an aqueous carrier fluid.

3. The method of claim 2 wherein the carrier fluid is a fracturing fluid.

4. The method of claim 2 wherein the carrier fluid contains from about 0.001 to about 2 weight percent of the controlled release capsules based on the weight of the carrier fluid.

5. The method of claim 1 wherein the breaker enclosed by the enclosure member is partially released to the aqueous fracturing fluid by the crushing of the capsules due to closure of the formation and partially released to the fluid due to fluid penetration into the capsule.

6. The method of claim 1 wherein the enclosure member comprises a coating material which is permeable to at least one fluid existing in the subterranean environment or injected with the controlled release capsules.

7. The method of claim 1 wherein the controlled release capsules are injected in a mixture or sequentially with capsules having an enclosure member which is substantially impermeable to the fluid or fluids existing in the formation or injected with the capsules having such an impermeable enclosure member or the controlled release capsules and which impermeable capsules contain the same or different breaker as contained by the controlled release capsules.

8. The method of claim 1 wherein the material has a water vapor transmission rate as a 1 mil film of less than about 5 g/100 in²/24 hours at 38° C. and greater than about 0.05 g//100 in²/24 hours at 38° C.

9. The method of claim 1 wherein the controlled release capsule comprises a multiple wall enclosure member.

10. The method of claim 1 wherein the controlled release capsule comprises a polynuclear core wherein each core is encapsulated by a permeable enclosure member but agglomerated or otherwise attached to form a single particle.

11. A method for breaking an aqueous fracturing fluid which comprises injecting into a subterranean formation controlled release capsules comprising an enclosure member containing a breaker for the aqueous fracturing fluid; the enclosure member comprising a homopolymer or copolymer of ethylene, propylene, isobutylene, vinyl chloride, or vinylidene chloride which enclosure member is sufficiently permeable to at least one fluid existing in the subterranean environment or injected with the controlled release capsules such that the enclosure member is capable of releasing the breaker upon sufficient exposure to the fluid.

12. The method of claim 11 wherein the enclosure member is a polymer of ethylene, propylene, isobutylene, vinyl chloride and vinylidene chloride.

13. The method of claim 11 wherein the enclosure member is polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

14. The method of claim 13 wherein the breaker is a material which will react with the fluid which has penetrated into the capsule to form a gas.

15. The method of claim 14 wherein the breaker is an enzyme, oxidizing agent, a transition metal salt, in ionized form, an acid or mixture thereof.

16. The method of claim 15 wherein the breaker is an oxidizing agent.

17. The method of claim 16 wherein the oxidizing agent is ammonium, sodium or potassium persulfate; sodium peroxide; sodium chlorite; sodium, lithium or calcium hypochlorite; chlorinated lime; potassium perphosphate; sodium perborate; magnesium monoperoxyphthalate hexahydrate or N,N'-dichlorodimethylhydantoin.

18. The method of claim 17 wherein the enclosure member is applied to the breaker at a coating thickness of from about 0.5 to about 60 μm.

19. The method of claim 16 wherein the enclosure member is a copolymer of vinyl chloride and vinylidene chloride or a copolymer of vinylidene chloride and an ester of an unsaturated carboxylic acid.

20. The method of claim 19 wherein the controlled release capsules have an average particle size from about 0.1 to 2 millimeters and the enclosure member is applied at a coating thickness of from about 5 to about 40 μm.

21. A fracturing fluid comprising a carrier fluid, a viscosifying polymer and controlled release capsules of an enclosure member enclosing a breaker for the viscosifying polymer wherein the enclosure member is sufficiently permeable to the carrier fluid or at least one fluid existing in the subterranean environment such that, upon sufficient exposure, the enclosure member is capable of rupturing, thereby releasing the breaker.

22. The fracturing fluid of claim 21 wherein the carrier fluid is an aqueous liquid.

23. The fracturing fluid of claim 22 wherein the fracturing fluid further comprises a surfactant, a salt, an anti-foam agent, a bactericide or a cross-linking agent for the polymer viscosifier.

24. The fracturing fluid of claim 22 wherein the fracturing fluid contains from about 0.001 to about 2 weight percent of the controlled release capsules based on the weight of the carrier fluid.

25. A method for breaking an aqueous fracturing fluid which comprises injecting into a subterranean formation a controlled release capsule comprising an enclosure member containing the breaker; the enclosure member being prepared from a material having a water vapor transmission rate as a 1 mil film of less than about 20 g/100 in$^2$/24 hours at 38° C. and greater than about 0.01 g/100 in$^2$/24 hours at 38° C. and being sufficiently permeable to at least one fluid existing in the subterranean environment or injected with the controlled release capsule such that the enclosure member is capable of releasing the breaker upon sufficient exposure to the fluid.

26. A method for breaking an aqueous fracturing fluid which comprises injecting into a subterranean formation controlled release capsules comprising an enclosure member containing a breaker for the aqueous fracturing fluid; the enclosure member comprising an epoxide, polycarbonate, or polymer of ethylene oxide or propylene oxide which enclosure member is sufficiently permeable to at least one fluid existing in the subterranean environment or injected with the controlled release capsules such that the enclosure member is capable of releasing the breaker upon sufficient exposure to the fluid.

27. A fracturing fluid comprising a carrier liquid, a viscosifying polymer and controlled release capsules of an enclosure member containing a breaker for the viscosifying polymer wherein the enclosure member is a homopolymer or copolymer of ethylene, propylene, isobutylene, vinyl chloride, or vinylidene chloride which enclosure member is sufficiently permeable to the carrier fluid or at least one fluid existing in the subterranean environment such that, upon sufficient exposure, the enclosure member is capable of rupturing, thereby releasing the breaker.

28. The fracturing fluid of claim 27 wherein the carrier fluid is an aqueous liquid and the enclosure member is prepared from a material having a water vapor transmission rate as a 1 mil film of less than about 20 g/100 in$^2$/24 hours at 38° C. and greater than about 0.01 g/100 in$^2$/24 hours at 38° C.

29. The fracturing fluid of claim 27 wherein the breaker is an enzyme, oxidizing agent, a transition metal salt, in ionized form or mixture thereof.

30. The fracturing fluid of claim 29 wherein the breaker is an oxidizing agent.

31. The fracturing fluid of claim 30 wherein the oxidizing agent is ammonium, sodium or potassium persulfate; sodium peroxide; sodium chlorite; sodium, lithium or calcium hypochlorite; chlorinated lime; potassium perphosphate; sodium perborate; magnesium monoperoxyphthalate hexahydrate or N,N'-dichlorodimethylhydantoin.

32. The fracturing fluid of claim 27 wherein the breaker is coated at a coating thickness of from about 0.5 to about 60 μm.

33. The fracturing fluid of claim 32 wherein the controlled release capsules have an average particle size from about 0.1 to 2 millimeters and the enclosure member is applied at a coating thickness of from about 5 to about 60 μm.

34. The fracturing fluid of claim 27 wherein the controlled release capsule comprises a multiple wall enclosure member.

35. A fracturing fluid comprising a carrier liquid, a viscosifying polymer and controlled release capsules of an enclosure member containing a breaker for the viscosifying polymer wherein the enclosure member comprises an epoxide, polycarbonate, or a polymer of ethylene oxide or propylene oxide which enclosure member is sufficiently permeable to the carrier fluid or at least one fluid existing in the subterranean environment such that, upon sufficient exposure, the enclosure member is capable of rupturing, thereby releasing the breaker.

* * * * *

UNITED STATES PATENT AND TRADEMARK OFFICE
CERTIFICATE OF CORRECTION

PATENT NO. : 4,741,401

DATED : May 3, 1988

INVENTOR(S) : Wilhelm E. Walles, Trevor D. Williamson & Donald L. Tomkinson

It is certified that error appears in the above-identified patent and that said Letters Patent is hereby corrected as shown below:

In the Abstract, line 2, "a enclosure" should correctly appear --an enclosure--.

Column 2, line 3, "gell" should correctly appear --gel--.

Column 7, line 21, "if" should correctly appear --is--.

Column 9, line 58, "solids" should correctly appear --solids.--.

Column 9, line 64, "240 seconds" should correctly appear --240 minutes--.

Column 10, line 22, "0.2" should correctly appear --0.02--.

Column 10, line 63, "the the capsules" should correctly appear --the capsules--.

Column 11, line 58, "g//100" should correctly appear --g/100--.

Signed and Sealed this

Fourth Day of February, 1992

Attest:

HARRY F. MANBECK, JR.

*Attesting Officer*  *Commissioner of Patents and Trademarks*